Aug. 14, 1962 — A. HOLDERITH — 3,049,010
FLOAT CONSTRUCTION
Filed Sept. 11, 1959
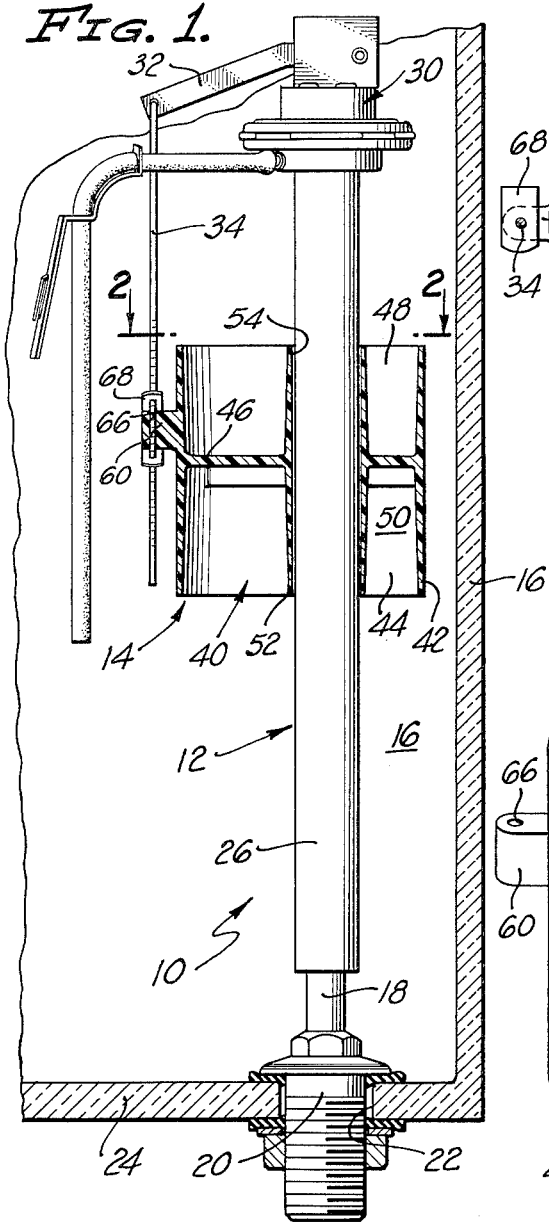
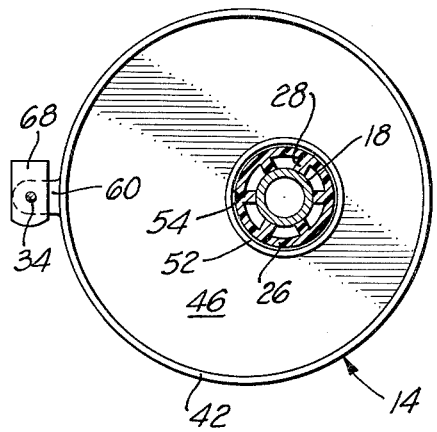
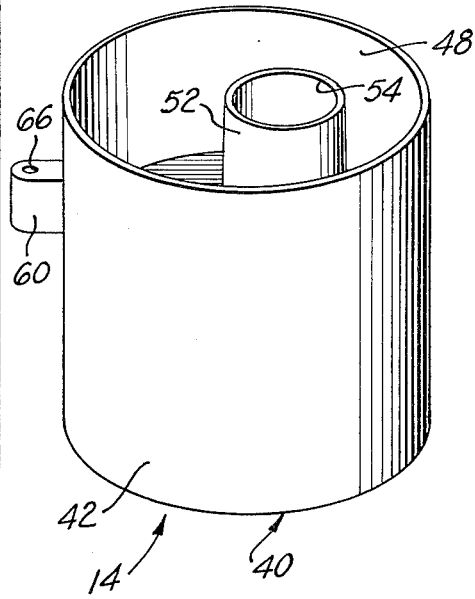
INVENTOR.
ANTON HOLDERITH
BY Thomas F. Mahoney
ATTORNEY United States Patent Office 3,049,010
Patented Aug. 14, 1962

3,049,010
FLOAT CONSTRUCTION
Anton Holderith, Anaheim, Calif., assignor to Fluidmaster, Inc., Anaheim, Calif., a corporation of California
Filed Sept. 11, 1959, Ser. No. 839,366
4 Claims. (Cl. 73—322.5)

This invention relates to a float construction including a float and a guide therefor, said float construction having particular application in the control of various types of fluid control valves and being adapted to automatically shut said valves when the level of the fluid in which the float portion of the construction is located reaches a predetermined height.

In disclosing the float construction of the invention, it will be described hereinbelow as applied in the control of a ball cock utilized to determine the level of a fluid, such as water, within the flush tank of a toilet. However, it will be obvious to those skilled in the art that the teachings of the invention may be applied with equal cogency to various types of devices and it is not intended to limit the application of the invention to any specific environment.

One of the problems encountered in the utilization of a vertically movable float mounted on a vertical guide member within the confines of a conventional flush tank is the fact that such vertically movable float may have its side wall so closely juxtaposed to the internal wall of the flush tank that it may impinge and bind thereupon. This is due, in part, to the fact that the float may be so closely juxtaposed to the inner surfaces of the walls of the tank that the adjacent periphery of a float having its vertical axis coincident with the vertical axis of the associated guide member is so close to said internal surfaces that the slightest mislocation thereof will cause it to contact said internal surfaces.

When binding of the float on the internal surface of the end wall of the flush tank occurs in the above described manner, impairment of the valve action is a frequent consequence of such binding since the float may be locked in a position in which the valve or ball cock associated therewith is maintained in open condition, thus permitting continuous flow of fluid into the tank which may result in ultimate flooding of the tank and the area in which the tank is located with consequent damage to the area and wastage of water or other fluid.

It is, therefore, an object of the invention to provide a float construction which includes a vertical guide member and a float constituted by a cylindrical body which incorporates a tubular guide member engaging passage and located eccentrically with respect to the vertical axis of said body.

Another object of the invention is the provision of a float construction of the aforementioned character wherein the exterior of the float is defined by a cylindrical wall and the guide receiving bore of the float is defined by a cylindrical, tubular wall supported inwardly of the external cylindrical wall by a supporting partition mounted on or formed integrally with the internal surface of said external cylindrical wall.

By forming the tubular wall eccentrically with respect to the vertical axis of the cylindrical wall and of the float body defined thereby, the external surface of the external cylindrical wall can be spaced a considerable distance from the internal surfaces of the walls of the flush tank, thus preventing the external surface of the cylindrical wall from impinging on the internal surfaces of the walls of the flush tank and eliminating the possibility that binding of the float thereupon may occur.

Other objects and advantages of the invention will be apparent from the following specification and the accompanying drawing which is for the purpose of illustration only and in which:

FIG. 1 is a vertical, partly sectional view of a float construction manufactured in accordance with the teachings of the invention;

FIG. 2 is a transverse, partly sectional view taken from the broken line 2—2 of FIG. 1; and FIG. 3 is an enlarged perspective view of the float incorporated in the float construction of the invention.

Referring to the drawing and particularly to FIG. 1 thereof, we show a float construction 10 constructed in accordance with the teachings of the invention and including a vertical guide member indicated generally at 12 and a float 14. The float construction 10 is adapted to be mounted in a flush tank, the walls 16 of which are fragmentarily shown in FIG. 1 of the drawing.

In the present embodiment of the invention, the vertically oriented guide member is constituted by a water inlet pipe 18 whose lower extremity is secured in a fitting 20 adapted to be mounted in a corresponding opening 22 in the bottom 24 of the flush tank and to be retained therein by an appropriate fastener, not shown. Encompassing the perimeter of the inlet pipe 18 is an outlet pipe 26 which may be formed from plastic, or the like, and which includes a plurality of inwardly directed, radial ribs 28, FIG. 2, defining a plurality of outlet passages in conjunction with the external of the inlet pipe 18.

Mounted upon and in operative relationship with the upper extremity of the inlet and outlet pipes 18 and 26, respectively, is a ball cock 30 whose construction is not relevant to the present invention, with the exception that it is provided with a laterally extending control lever 32 secured by means of a connecting rod 34 to the float 14 in order that the upward or downward movement of said float may be communicated through said connecting rod and lever to a valve member, not shown, in the ball cock 30 in order that flow of water from the inlet pipe 18 to the outlet pipe 26 may be controlled by the position of the float 14.

In other words, when the float 14 is disposed in its uppermost position with respect to the ball cock 30 by the attainment of a predetermined fluid level within the flush tank, the lever 32 will be in its uppermost position to prevent flow of fluid from the inlet pipe 18 to the outlet pipe 26. Conversely, when the float 14 is in its lowermost position, the lever 32 will be correspondingly lowered to open the ball cock 30 and permit fluid flow to the outlet pipe 26 from the inlet pipe 18 until the fluid level within the flush tank is restored to its predetermined limit.

The float 14 may be constructed from any desired type of material such as rubber, various types of synthetic plastics, metal and the like, and it is not intended that the teachings of the invention be limited to the utilization of any specific material.

The float 14 includes a body 40 which is constituted by a substantially cylindrical external wall 42 which defines a chamber 44. Formed integrally with the internal surface of the external cylindrical wall 42 is a transversely oriented partition 46 which is located intermediate the upper and lower extremities of the external cylindrical wall 42 and which defines upper and lower receptacles 48 and 50 in conjunction with the external cylindrical wall 42.

Formed integrally with the partition 46 is an internal cylindrical wall 52 which defines a tubular bore 54 adapted to encompass the perimeter of the outlet pipe 26. The lower receptacle 50 and the upper receptacle 48 thus have their interior walls defined by the external surface of the internal cylindrical wall 52. The upper receptacle 48 can be filled with water or other fluid or solids to insure that the float will drop downwardly with the drop in the liquid level in the flush tank and the lower receptacle 50 serves as an air pocket adapted to cause the float to rise as the liquid level rises within the flush tank.

In will be noted that the internal cylindrical wall 52 is located eccentrically with respect to the vertical axis of the float 14 as a whole and the external cylindrical wall 42. Furthermore, the internal cylindrical wall 52 is disposed with its exterior disposed more closely to the right-hand side of the internal surface of the external cylindrical wall 42, as best shown in FIG. 1 of the drawing, in order that the external surface of the external cylindrical wall 42 will be spaced from the internal surfaces of the walls 16 of the flush tank.

Therefore, the possibility that the internal surfaces of the walls 16 of the flush tank may be engaged by the external surface of the external cylindrical wall 42 is obviated. In this manner, free movement of the float 14 with respect to the outlet pipe 26 is assured and the possibility that the float 14 may engage upon an adjacent surface of the flush tank is eliminated.

The external surface of the external cylindrical wall 42 is provided with an integral connecting tab 60 which has the lower extremity of the connecting rod 34 extending through a bore 66 therein and a spring clip 68 engaged upon the connecting rod 34 and the opposite sides thereof to maintain the float 14 in a predetermined position of adjustment with respect to the connecting rod 34.

While the float 14 has been disclosed as including a particular combination of external and internal cylindrical walls and partitions therebetween, it will be obvious to those skilled in the art that the concept of providing an eccentric float of the character disclosed may be applied in a wide variety of different types of constructions. For instance, the float may be fabricated as a unitary body of porous flotation material, such as styrene foam or the like, and may simply have the eccentric bore formed therein by a drilling or other process.

In addition, while the body of the float has been shown in the configuration of a cylinder, it is conceivable that various other shapes may be utilized where particular applications so necessitate.

We claim:
1. A valve controlling float including a cylindrical external wall defining an internal chamber open at its upper and lower extremities and having an integral, centrally located partition disposed transversely of said chamber, said partition having a tubular wall formed integrally therewith and extending upwardly and downwardly therefrom and adapted to receive a guide member, said tubular wall being coterminus with said cylindrical wall and the perimeter of said partition terminating at the inner surface of said cylindrical wall, said partition in conjunction with said cylindrical wall defining a liquid receiving chamber in the upper portion of said float and a flotation chamber in the lower portion thereof.

2. A valve controlling float including a cylindrical external wall defining an internal chamber open at its upper and lower extremities and having an integral, centrally located partition disposed transversely of said chamber, said partition having a tubular wall formed integrally therewith and extending upwardly and downwardly therefrom and adapted to receive a guide member, said tubular wall being located eccentrically with respect to the vertical axis of said float, said tubular wall being coterminus with said cylindrical wall and the perimeter of said partition terminating at the inner surface of said cylindrical wall, said partition in conjunction with said cylindrical wall defining a liquid receiving chamber in the upper portion of said float and a flotation chamber in the lower portion thereof.

3. In a float construction, the combination of: an elongated guide; and a float having a cylindrical external wall defining an internal chamber open at its upper and lower extremities divided by a transversely oriented partition located intermediate the top and bottom of said external wall and incorporating an integral, tubular member adapted to receive said elongated guide, said integral tubular member being coterminus with the opposite extremities of said cylindrical wall and said partition being formed integrally with and terminating at the inner surface of said cylindrical wall.

4. In a float construction, the combination of: an elongated guide; and a float having a cylindrical external wall defining an internal chamber open at its upper and lower extremities divided by a transversely oriented partition located intermediate the top and bottom of said external wall and incorporating an integral, tubular member adapted to receive said elongated guide, said integral, tubular member being located in said partition eccentrically with respect to the vertical axis of said float, said external cylindrical wall, said partition, and said tubular member being formed integrally with one another, said tubular member being coterminous with the opposite extremities of said cylindrical wall and the perimeter of said partition being located immediately adjacent the inner surface of said cylindrical wall.

References Cited in the file of this patent

UNITED STATES PATENTS

| 473,961 | Rhett | May 3, 1892 |
|---|---|---|
| 682,382 | Gray | Sept. 10, 1901 |
| 1,425,857 | Harrison | Aug. 15, 1922 |
| 2,564,305 | Hicks | Aug. 14, 1951 |
| 2,747,605 | Adams | May 29, 1956 |
| 2,761,467 | Arne | Sept. 4, 1956 |
| 2,808,850 | Doyle | Oct. 8, 1957 |
| 2,900,996 | Goldtrap | Aug. 25, 1959 |

FOREIGN PATENTS

| 307,377 | Germany | Aug. 20, 1918 |